(12) United States Patent
Masotta et al.

(10) Patent No.: US 6,300,971 B1
(45) Date of Patent: Oct. 9, 2001

(54) APPARATUS AND METHOD FOR HANDLING MEDIA SHEETS IN A PHOTO-PLOTTER

(75) Inventors: John R. Masotta, Bethany; Kenneth R. Petersen, West Hartford; Alan W. Menard, Bolton; Gene D. Welti, Ellington, all of CT (US)

(73) Assignee: Gerber Systems Corporation, South Windsor, CT (US)

( * ) Notice: Subject to any disclaimer, the term of this patent is extended or adjusted under 35 U.S.C. 154(b) by 0 days.

(21) Appl. No.: 09/187,336

(22) Filed: Nov. 6, 1998

(51) Int. Cl.[7] ..................................................... B41J 2/435
(52) U.S. Cl. .......................... 347/264; 347/262; 101/481; 101/DIG. 36
(58) Field of Search .................................... 347/264, 262, 347/164; 101/481, 483, 485, 486, DIG. 36, 232; 271/276, 275, 226, 232

(56) References Cited

U.S. PATENT DOCUMENTS

| 5,214,990 | * | 6/1993 | Ben-David et al. | 83/13 |
| 5,276,465 | * | 1/1994 | Menard et al. | 271/276 X |
| 5,383,001 | * | 1/1995 | Bosy | 271/276 X |
| 5,488,906 | * | 2/1996 | Iron et al. | 101/477 |
| 5,619,246 | * | 4/1997 | Straayer et al. | 347/262 |
| 5,716,048 | * | 2/1998 | Morrissette | 271/276 |
| 5,889,547 | * | 3/1999 | Rombult et al. | 347/262 |
| 6,097,475 | * | 8/2000 | Jakul et al. | 271/276 X |

* cited by examiner

Primary Examiner—John S. Hilten
Assistant Examiner—Minh H. Chau
(74) Attorney, Agent, or Firm—McCormick, Paulding & Huber LLP

(57) ABSTRACT

An apparatus for handling media sheets in a photo-plotter includes a plurality of aligning mechanisms for precisely positioning the media sheet relative to a drum of the photo-plotter. Each aligning mechanism has engaged and disengaged positions and include a registration pin having corresponding extended and retracted positions. In the engaged position, the extended registration pins of the aligning mechanisms pass through mounting features formed within the media sheet and are engagable with a plurality of drum openings formed within the drum of the photo-plotter. The present invention ensures that the media sheet is properly placed on the drum and also precisely positions the generated image relative to the mounting features.

18 Claims, 7 Drawing Sheets

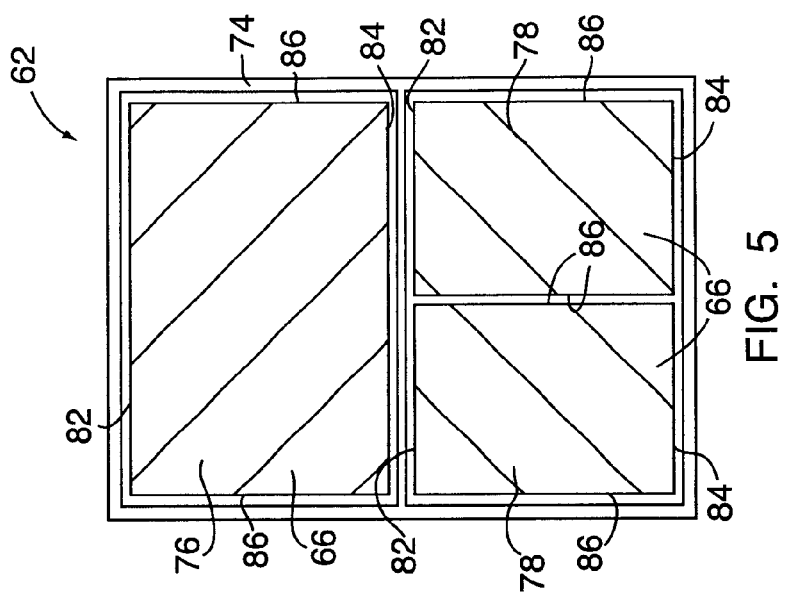
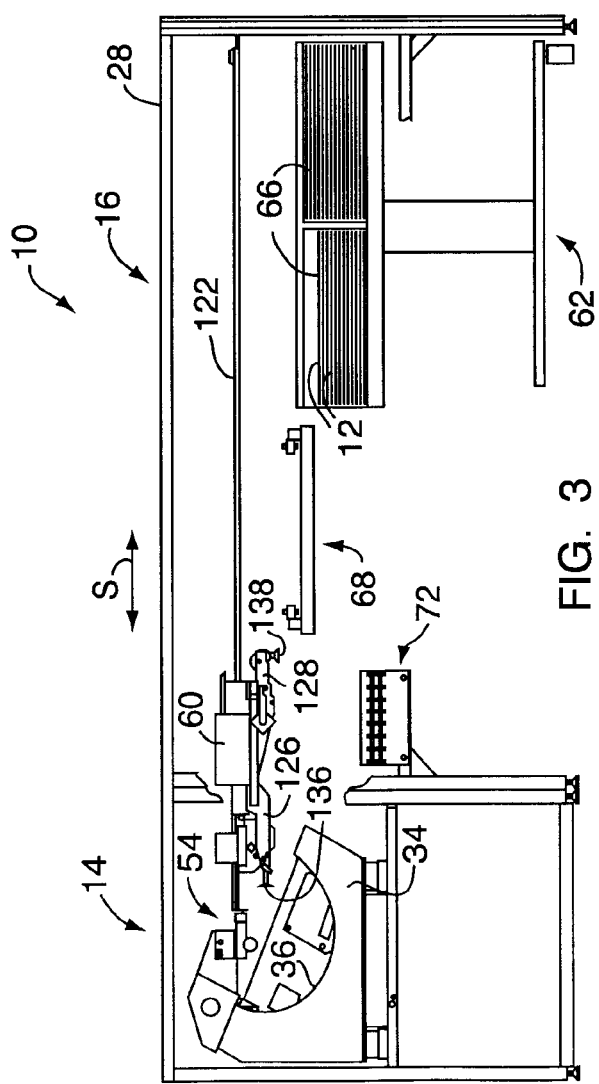
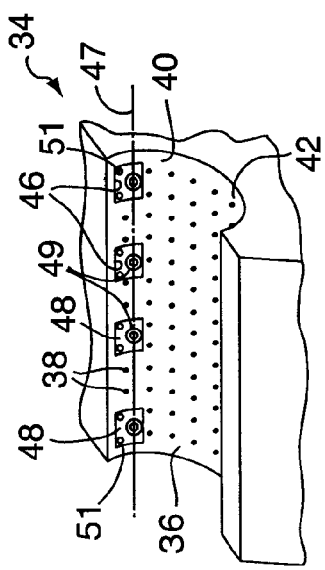

APPARATUS AND METHOD FOR HANDLING MEDIA SHEETS IN A PHOTO-PLOTTER

FIELD OF THE INVENTION

The present invention relates to an apparatus and method for handling media sheets in a photo-plotter and, more particularly, to an apparatus and method for forming fixed holes, notches or other mounting features in each media sheet and for positioning each media sheet at the exposure station of the plotter with reference to those mounting features so that the images produced on the sheet are accurately located relative to the mounting features, the mounting features later being used to mount and accurately position the media sheet and its images relative to a printing cylinder or other supporting member of a printing press.

BACKGROUND OF THE INVENTION

Internal drum plotters are typically used to optically produce images either on a media sheet for subsequent use in printing operations or during production of printed circuit boards. Conventional internal drum plotters include a concave semi-cylindrical imaging drum and a rapidly spinning projection mirror which directs a light beam from a laser or other source downwardly onto a media sheet supported by the drum and which moves the beam in raster scanning fashion over the sheet while the beam is modulated in accordance with image defining data. The directed and modulated light beam produces images on the media sheet. U.S. Pat. No. 5,619,246 entitled "Apparatus and Method of Positioning Photo Sensitive Media on an Exposure Platen" and assigned to the assignee of the present invention, is incorporated by reference herein and describes a media handling system that handles media sheets in their movement to-and-from an exposure station provided by an internal drum.

Subsequently to a media sheet being imaged, the sheet may be further processed as by a chemical developing step, if necessary, and then is used in the printing operations of a printing press. The printing process requires the imaged media sheet to include a certain arrangement of mounting features, such as holes, slots and/or notches, used both to secure the imaged media sheet to a cylinder or other supporting structure of the printing press and to accurately position the sheet relative to that structure It is imperative that the image carried by each imaged media sheet be properly positioned on the printing press to result in a high quality final image. To ensure such proper positioning of the image, precise fixing of the image relative to the mounting features formed in the media sheet is required. The precise positioning of the image relative to the mounting features is particularly critical when the final printed product includes multiple colors. For a multiple color final product, multiple media sheets are imaged individually, with each media sheet corresponding to a particular color. Then, during the printing operation, the images of the multiple media sheets are individually applied, as color separations, to the same printed product. Even a minor registration discrepancy between the images created would result in an indistinct final product and they, therefore, need to lie in closely registered superimposition to one another. Therefore, it is critical during the imaging process to position the generated image on a media sheet precisely with respect to the mounting features used to attach and position the media sheet relative to the printing press.

It is, therefore, an object of the present invention to ensure proper placement of a media sheet at the exposure station of a media sheet imaging and handling system.

It is a more specific object of the present invention to ensure that mounting features formed within the media sheet are precisely positioned with respect to the generated image.

SUMMARY OF THE INVENTION

The invention resides in a system for photoplotting and handling media sheets having a plurality of aligning means that engage a plurality of mounting features formed in the media sheet and a plurality of drum openings formed in the drum of a photo-plotter for positioning the media sheet on the drum for subsequent imaging. Each aligning means has an engaged position and a disengaged position and includes a registration pin having extended and retracted positions, corresponding to the engaged and disengaged positions of the aligning means, respectively. In the extended position, the registration pins pass through the mounting features of the media sheet and locate and fit into the drum openings for properly positioning the media sheet on the drum. The mounting features are formed within the leading edge of the media sheet by punching means and have a centerline substantially parallel to the direction of movement of the scanning means of the photo-plotter.

One advantage of having the mounting features punched prior to the media sheet being imaged, and of positioning the media sheet on the drum utilizing the mounting features, is that greater printing accuracy and registration of color separation is achieved in the final printed product. The present invention Ensures that the media sheet is properly placed on the drum and also precisely positions the generated image relative to the mounting features.

The foregoing and other advantages of the present invention become more apparent in light of the following detailed description of the exemplary embodiments thereof, as illustrated in the accompanying drawings.

BRIEF DESCRIPTION OF THE DRAWINGS

FIG. 3 is a schematic, side elevational view of the system of FIG. 2;

FIG. 4 is an enlarged, fragmental, perspective view of a drum of the plotter of FIG. 3;

FIG. 5 is an enlarged, plan view of a supply cassette subassembly of the media handler of FIG. 3;

DETAILED DESCRIPTION OF THE PREFERRED EMBODIMENTS

Figure 1:
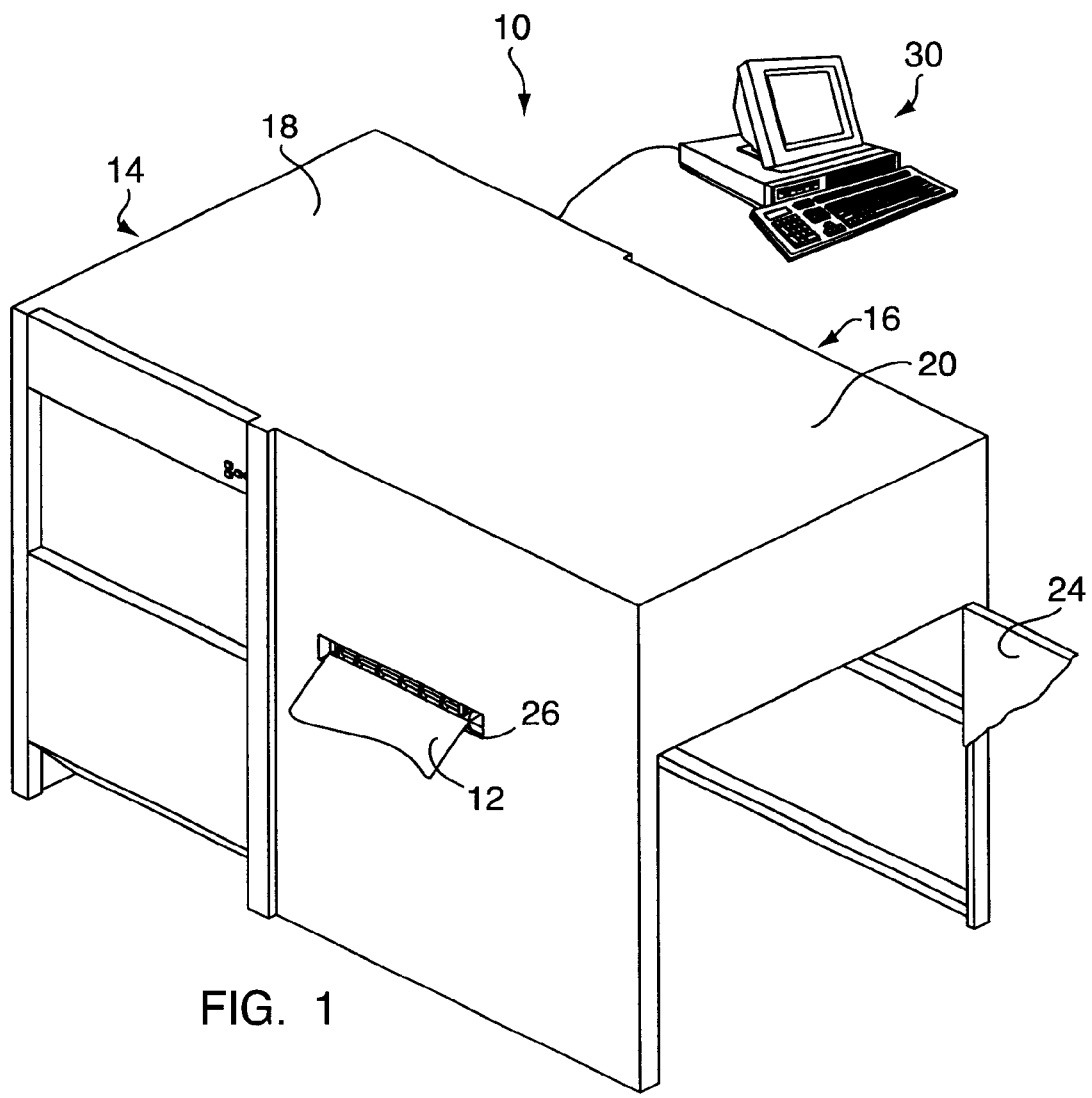
FIG. 1 is a perspective view of a plotter and media handling system enclosed by its housing.
Figure 2:
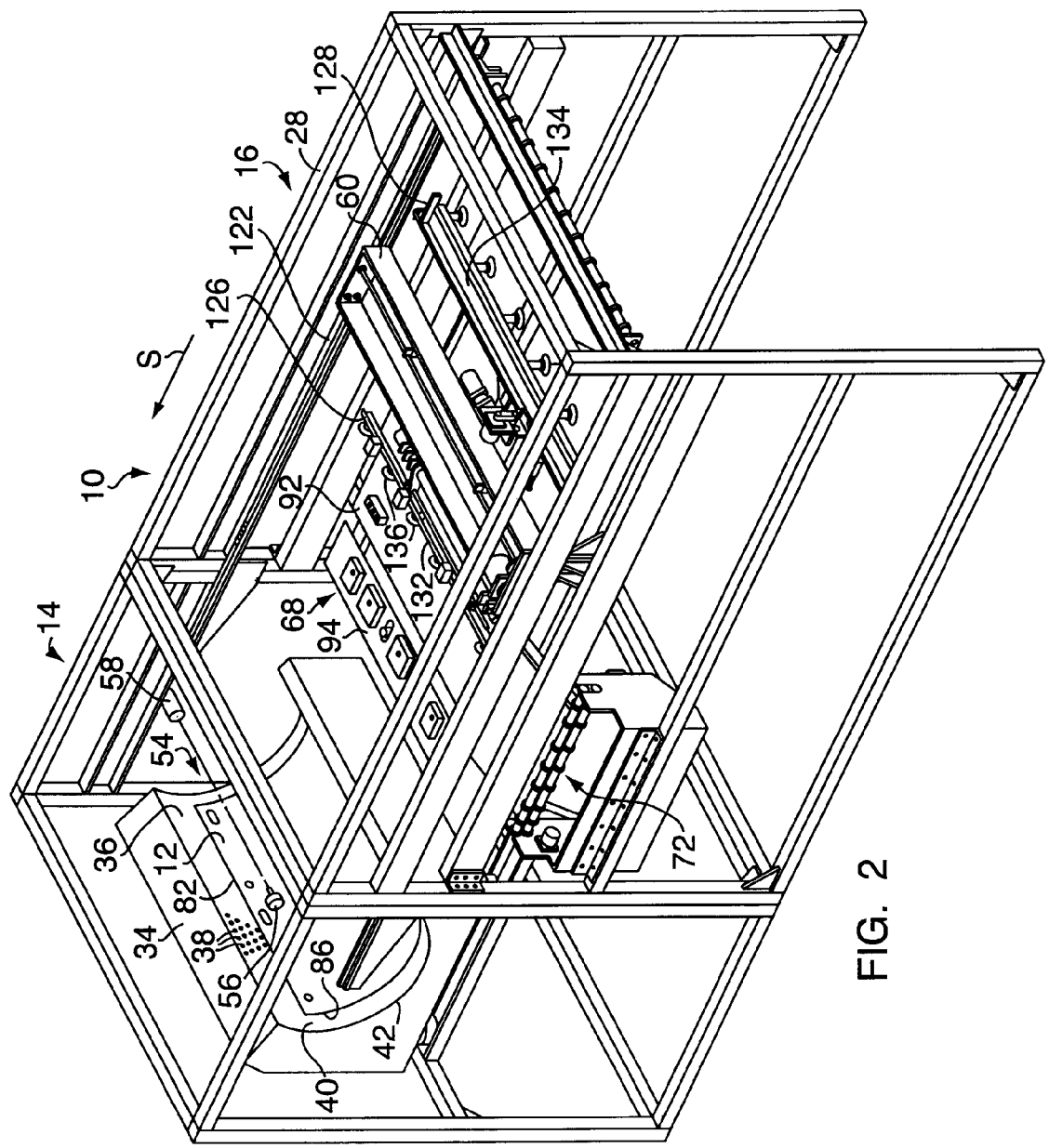
FIG. 2 is a perspective view of the plotter and media handling system of FIG. 1 with its housing removed.

Referring to FIG. 1, a system 10 for plotting and handling media sheets 12 includes a photo-plotter 14 and a media handler 16, each enclosed in a housing 18,20, respectively. The light-tight housing 18,20 includes a light-tight door 24 to allow access into the interior confines of the system 10 and a discharge opening 26 to allow discharge of the media sheet 12 from the system 10 for subsequent work operations. The housing 18,20 is supported by a frame 28, as best seen in FIG. 2. The system 10 also includes a computer 30 for downloading plotting and other instructions to the plotter 14 and the media handler 16.

Figure 13:
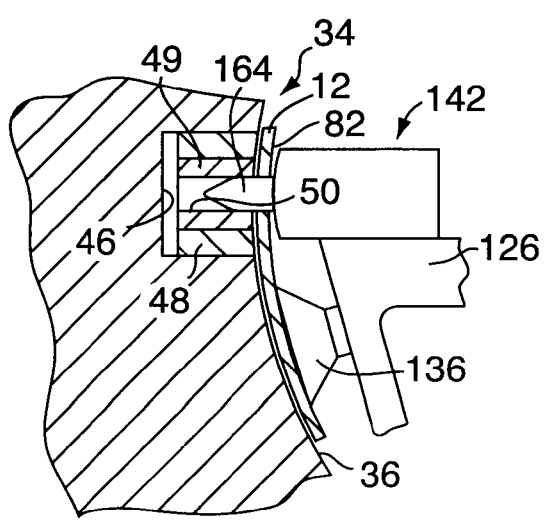
FIG. 13 is an enlarged, fragmental, cross-sectional view of a drum opening formed within the drum of FIG. 12 being engaged by the aligning means of FIG. 9 with the media sheet therebetween.

Referring to FIGS. 2 and 3, the photo-plotter 14 includes a crescent-shaped drum 34 with a part-cylindrical drum support surface 36 for supporting the media sheet 12. The drum 34 includes a plurality of pin holes 38 that are formed within the drum support surface 36, with each of the pin holes 38 connected and communicating with a pressurized air source (not shown) to produce vacuum pressure. The vacuum pressure in the pin holes 38 is activated in at least two zones 40,42 with the first zone 40 and the second zone 42 being controlled separately. The drum 34 also includes a plurality of drum openings 46 spaced apart from each other at a predetermined distance and aligned in an axial direction of the drum 34, as best seen in FIG. 4. A centerline 47 passes through the plurality of drum openings 46 and is substantially parallel to the axial direction of the drum 34. In the best mode embodiment, each drum opening 46 is adapted to receive an insert 48 with a bushing 49 mounted therein to ensure tight tolerances. Each bushing 49 has a bushing opening 50 of a predetermined diameter, as best seen in FIG. 13. Each insert 48 is secured to the drum 34 by means of fasteners 51, as shown in FIG. 4.

Referring to FIG. 2, the photo-plotter 14 also includes a scanning means 54 having a spinner assembly 56 and a laser source 58. The spinner assembly 56 comprises a parabolic mirror (not shown) for directing a light beam emitted by the laser source 58 onto the media sheet 12 supported by the drum support surface 36. The spinner assembly 56 moves in the axial direction of the drum 34 for scanning an image onto the media sheet 12.

The media handler 16 includes a media carriage 60 adapted for movement in the indicated "S" direction, a media supply assembly 62 for supporting stacks 66 of the of media sheets 12, a punching assembly 68 for punching a plurality of mounting features, such as holes, slots and/or notches, within the media sheets, and a discharge 72 means for releasing the media sheet 12 from the system 10, as best seen in FIGS. 2 and 3.

The media supply assembly 62 includes a supply cassette subassembly 74 for housing the stacks 66 of the media sheets, as best seen in FIG. 5. The double supply cassette accommodates two sizes of the media sheets, a double page 76 and two broad sheet pages 78 disposed side-by-side. The size of one double page 76 is substantially equivalent to the size of two broad sheets 78. Each media sheet 12 includes a leading edge 82 and a trailing edge 84 and sides 86.

Figure 7:
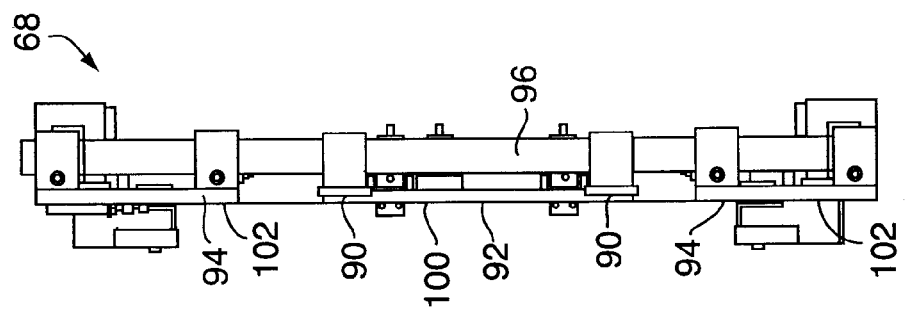
FIG. 7 is a side view of the punching means of FIG. 6.
Figure 6:
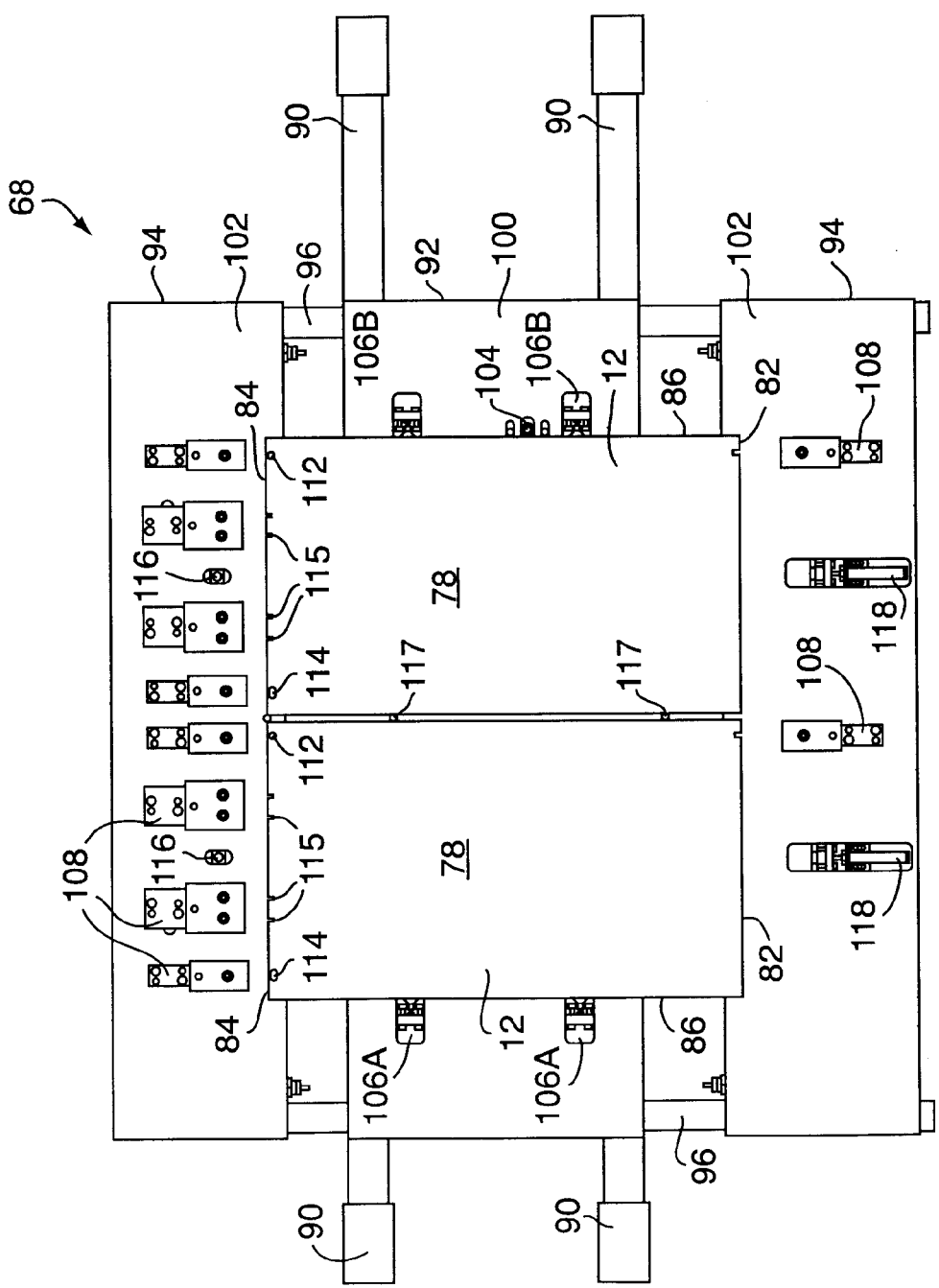
FIG. 6 is an enlarged, plan view of punching means of the system of FIG. 2.

Referring to FIG. 6, the punching means 68 is secured to the frame 28 by a pair of extensions 90 and includes a base plate 92, fixably attached to the pair of extensions 90, and two side plates 94, movable along a pair of support rails 96 towards the base plate 92. The base plate 92 includes a base plate surface 100 that is level with both side plate surfaces 102, as best seen in FIG. 7. The base plate 92 further includes a side stop 104 and a plurality of side pushing mechanisms 106A, 106B activated by pressurized air to urge the media sheets 12 against the side stop 104 to ensure proper alignment. The side plates 94 include a plurality of punching mechanisms 108 spaced apart a predetermined distance for punching mounting features 110 such as holes 112, slots 114 and notches 115 in the media sheets 12, a plurality of edge stops 116, 117 for properly aligning the media sheets with respect to the punching mechanisms 108, and a plurality of edge pushing mechanisms 118 for urging the media sheets against the edge stops 116, 117. The edge stops 117 are retrievable and used for aligning the broad sheets 78.

The base plate 92 of the punching assembly 68 also includes a plurality of grooves (not shown) communicating with a vacuum pressured air (not shown). The punching assembly 68 accommodates either a single double page 74 media sheet or two broad sheets 78.

In operation, the media sheets 12 are placed on the base plate surface 100 of the punching assembly 68 with the leading and trailing edges 82,84 of the media sheets 12 being supported by the side plate surfaces 102. The side plates 94 are then moved into the engaged position until the edge stops 116 come into contact with the edges 82 of the media sheets 12, thereby ensuring alignment of the media sheet within the punching assembly 68. As the side plates 94 are moved towards the base plate 92, the edges 82,84 of the media sheet 12 are positioned within the punching mechanisms 118. Once the media sheet is properly aligned within the punching mechanisms 118, the punching assembly vacuum is activated to retain the media sheet in proper alignment during the punching operation. Subsequently, the appropriate punching mechanisms 118 are activated to punch a plurality of holes, notches and/or slots in the media sheet.

Referring to FIG. 2, the discharge means 72 is mounted to the frame 28 along one side of the media handler system 16 immediately adjacent to the discharge opening 26 for the purpose of discharging an exposed media sheet 12 onto, for example, a conveyor for developing. The discharge means 72 is similar to the discharge means described in the U.S. Pat. No. 5,619,246 assigned to the common assignee herewith and incorporated by reference herein.

The media carriage 60 moves along rails 122 secured to the frame 28 between a home position corresponding to the location of the media supply assembly 62 and an end position corresponding to the location where loading and unloading of the media to-and-from the drum 34 occurs. The media carriage 60 also has two intermediate positions, a first intermediate position corresponding to a location where the punching assembly 68 is disposed and a second variable intermediate position corresponding to a location where the media sheet 12 is released to the discharge means 72 for transport away from the system 10.

Referring to FIGS. 2 and 3, the media carriage 60 includes a first and second positioning means 126,128 for handling the media sheets 12 in coordinated linear and rotational movement such that the media sheets can be lifted from an otherwise flat stack supply of such media sheets and transported to the half-cylindrical drum 34. Both the first and second positioning means 126,128 are rotatable about at least one axis of rotation and are movable with the media carriage in the indicated "S" direction along the rails 122. The first and second positioning means 126,128 include a first and second pick-up bars 132,134, respectively, as best seen in FIG. 2. Each pick-up bar 132,134 further includes a plurality of suction gripper elements 136,138, respectively. Each suction gripper element 136,138 is connected to a vacuum source for controlled pick-up of the media sheet 12.

Figure 8:
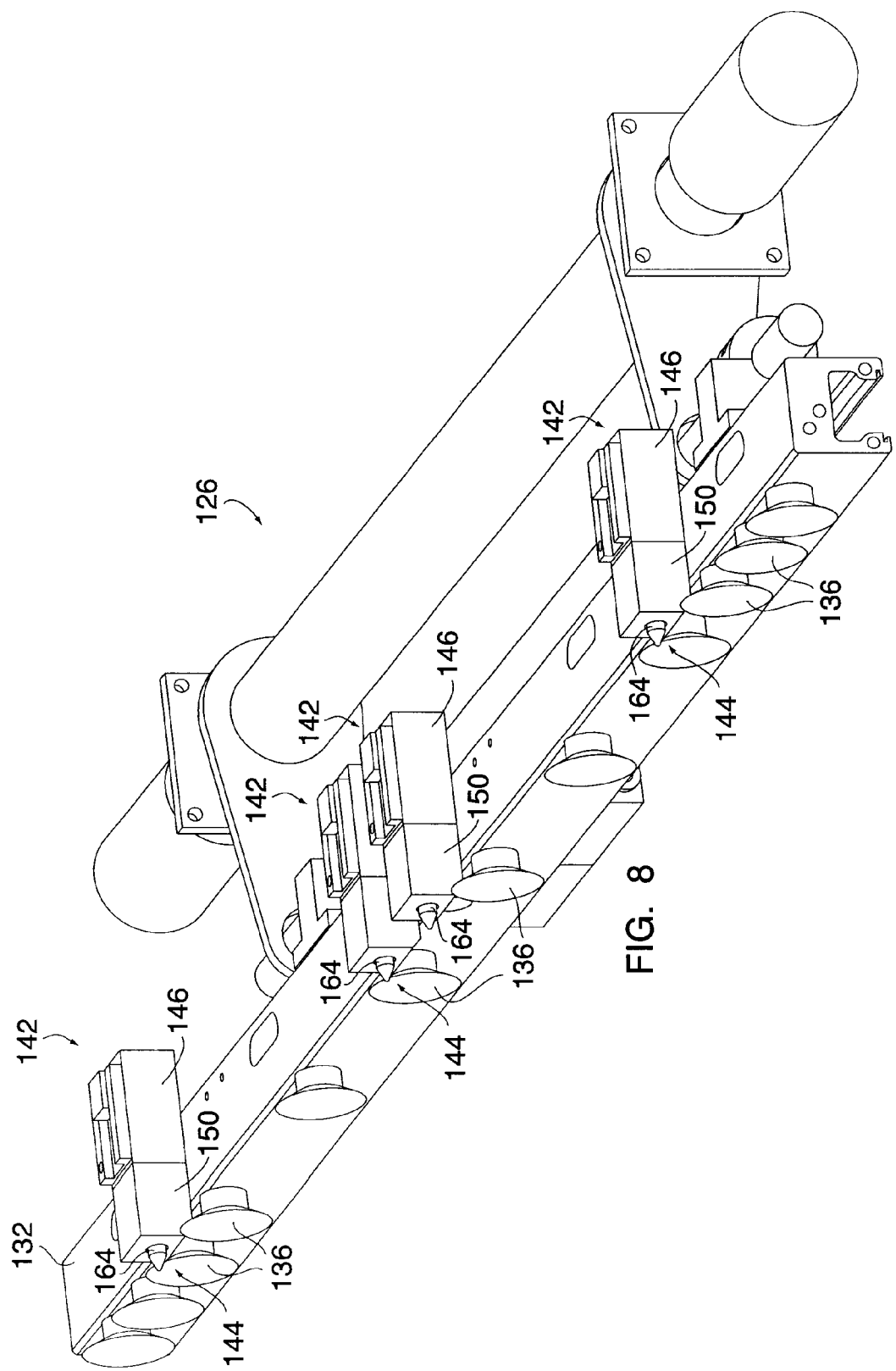
FIG. 8 is an enlarged, perspective view of a first positioning means of a media carriage of the media handler of FIG. 3.
Figure 9:
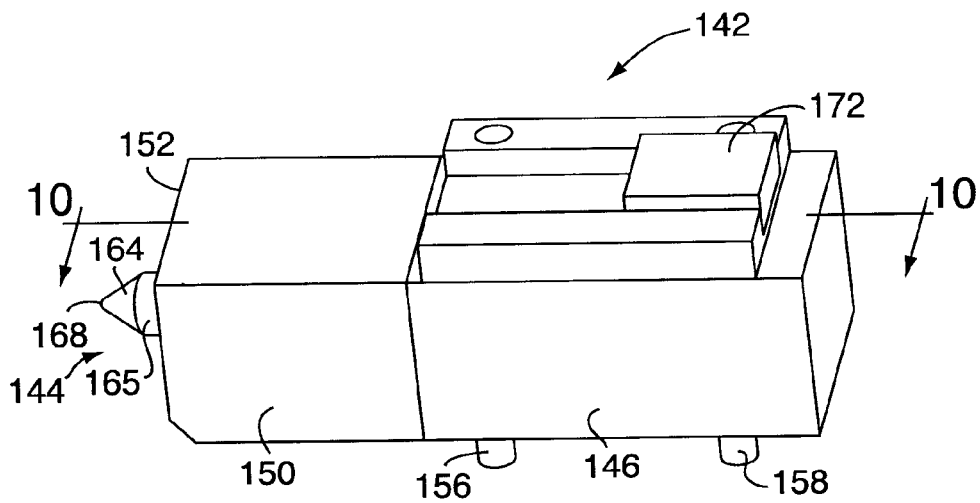
FIG. 9 is an enlarged, perspective view of an aligning means disposed on the first positioning means of FIG. 8.

Referring to FIG. 8, the first pick-up bar 132 further includes a plurality of aligning means 142 fixably attached to the pick-up bar 132. Each aligning means 142, having an engaged position and a disengaged position, comprises a registration pin subassembly 144 having an extended and retracted positions, that correspond to the engaged and disengaged positions of the aligning means, respectively. Each aligning means 142 further includes a piston housing 146 for housing an air piston 148 and a registration pin subassembly housing 150 adjacent to the piston housing 146, as best seen in FIG. 9. The registration pin housing 150 includes a curved aligning surface 152.

Figure 10:
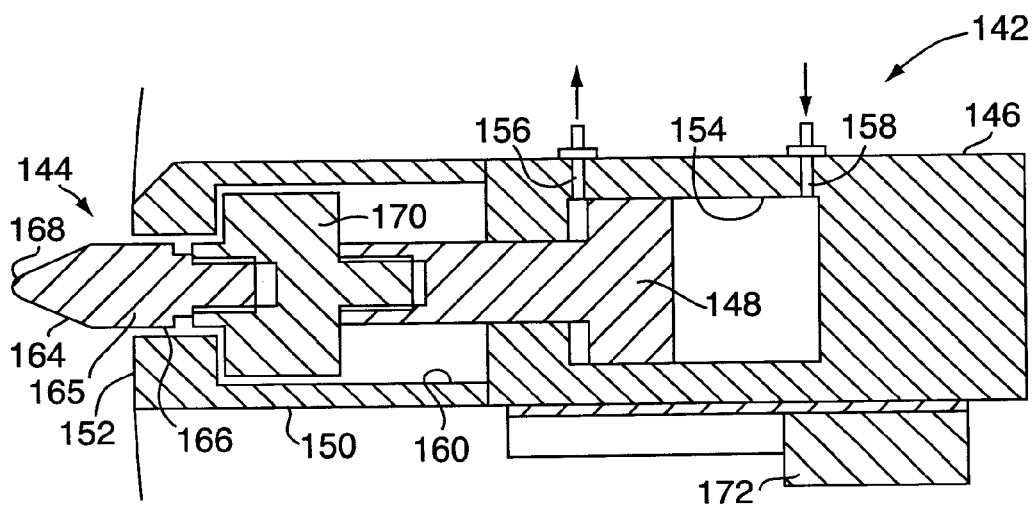
FIG. 10 is a front, cross-sectional view of the aligning means of FIG. 9 in an engaged position taken along line 10-10.
Figure 11:
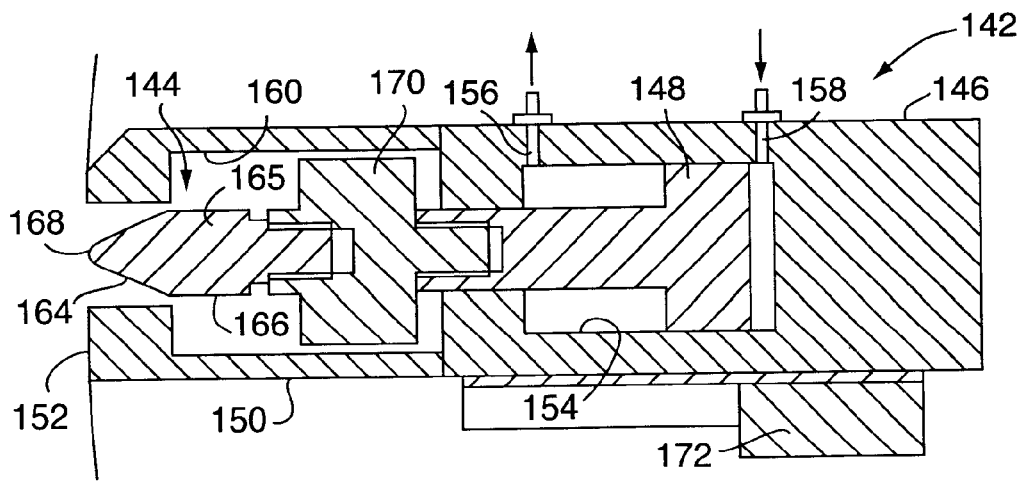
FIG. 11 is a front, cross-sectional view of the aligning means of FIG. 9 in a disengaged position.

Referring to FIGS. 10 and 11, the piston housing 146 includes a piston cavity 154 with a first and second channel opening 156,158. The first channel opening 156 and second channel opening 158 alternatingly supply the piston cavity 154 with pressurized air. A solenoid (not shown) controls an air valve and allows air to pass alternatingly through either the first or second channel openings 156,158. The registration pin subassembly housing 150 is fixedly attached to the piston housing 146 and includes an internal cavity 160 to accommodate the registration pin subassembly 144. The registration pin subassembly 144 includes a registration pin 164, having a location defining portion 165 with a pin outer diameter 166 and a bullet nose portion 168, and a pin coupling 170 for coupling the registration pin 164 to the piston 148. The coupling 170 also allows the registration pin 164 to move therein.

The aligning means 142 further includes a sensor 172 secured to the piston housing 146 for detecting the position of the piston 148. In the best mode embodiment, the sensor is a magnetic sensor that detects whether the piston is retracted. Alternatively, a sensor can detect whether the piston 148 is extended.

In the disengaged position, shown in FIG. 11, the piston 148 is retracted, thereby maintaining the registration pin 164 in the retracted position. When the aligning means 142 are activated into the engaged position, shown in FIG. 10, the solenoid (not shown) allows the pressurized air to enter through the second channel opening 158, thereby pushing the piston 148 outward into the engaged position with the first channel opening 156 functioning as an exhaust. When the aligning means 142 is activated into the disengaged position, the solenoid allows the pressurized air to enter through the first channel opening 156 pushing the piston into the piston cavity 154 and retracting the registration pin 164 with the second opening 158 functioning as an exhaust.

In operation, the media carriage 60, situated in the home position above the media supply cassette 74, is activated to start a work operation on the media sheet 12. Once the media carriage 60 is activated, the first and second positioning means 126,128 disposed over the media sheet are lowered such that the suction gripper elements 136,138 of both the first and second positioning means 126,128 come into contact with the media sheet 12 with the first positioning means 126 being disposed at the leading edge 82 of the media sheet and the second positioning means 128 being disposed at the trailing edge 84 of the media sheet. After the first and second positioning means 126,128 make contact with the media sheet, the vacuum source in the suction gripper elements 136, 138 is turned "on" to attach the media sheet to the media carriage 60. The media carriage 60 then lifts the media sheet from the supply cassette 74 and moves it to the first intermediate position over the punching assembly 68. The first and second positioning means 126,128 can either pick-up a single double page 76 or two broad sheets 78 disposed side-by-side or a single broad sheet 78, as shown in FIG. 5.

The first and second positioning means 126,128 place the media sheet onto the base plate surface 100 of the punching assembly 68, as best seen in FIG. 6. The leading edge 82 and the trailing edge 84 are supported by the side plate surfaces 102 of the punching assembly 68. The vacuum in the suction gripper elements 136, 138 is turned "off" and the media carriage 60 moves away. The side plates 94 of the punching assembly 68 are moved toward the base plate 92 until the media sheet leading edge 82 comes into contact with the edge stops 116 and the trailing edge 84 comes into contact with the edge pushing mechanisms 118. For the double page 76, the sides 86 are pushed against the side-stop 104 by the side pushing mechanisms 106A. For the broad sheets 78, the sides 86 are pushed against the stops 117 by the side pushing mechanisms 106A and 106B. Once the media sheet 12 is properly aligned within the punching assembly 68, the punching assembly vacuum is activated and the punching mechanisms 108 are activated to punch holes, slots and/or notches in the designated locations on the leading and trailing edges 82,84 of the media sheet 12.

In the preferred embodiment, the leading edge 82 of the double page media sheet 76 includes two slots and two holes and the leading edge 82 of each broad sheet 78 includes a slot 114 and a hole 112. The slot and the hole are disposed on the same centerline extending in the axial direction of the drum 34 substantially parallel to the direction of movement of the spinner assembly. The hole and the slot have the same diameter to ensure exact positioning of the media sheet within the drum 34 relative to the spinner assembly 56. However, the elongated slot compensates for dimensional tolerances and thermal changes in the media sheet in the axial direction. Once the appropriate holes, slots and notches are punched, the side plates 94 are moved away from the base plate 92. The media carriage then moves directly above the media sheet and the suction gripper elements 136,138 are lowered to the media sheet 12 and then attached to the media sheet 12 with the vacuum pressure.

Figure 12:
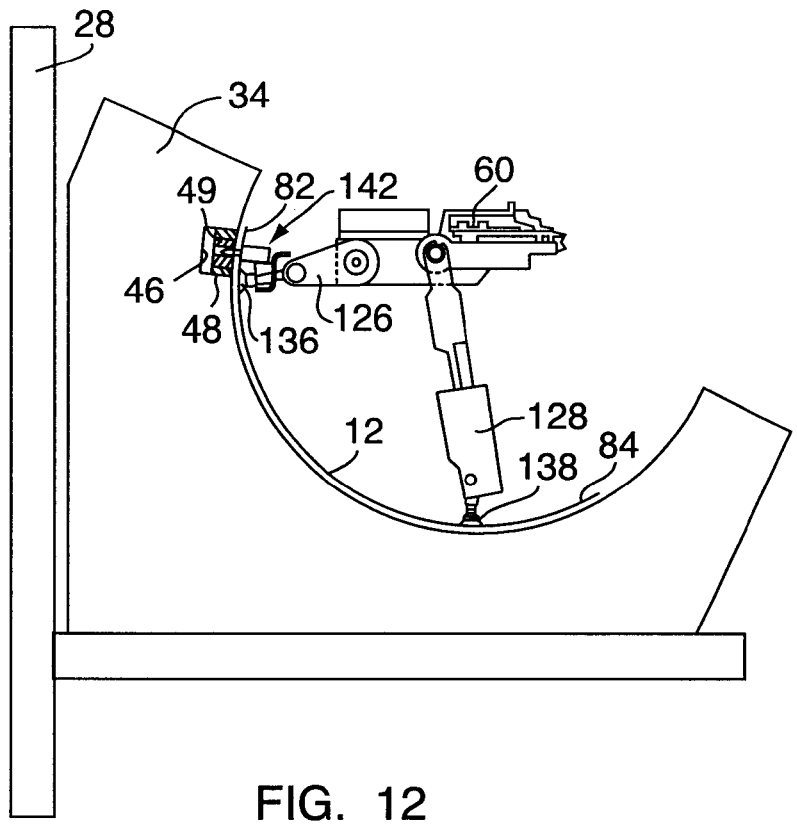
FIG. 12 is an enlarged, fragmental side view of the drum of FIG. 4 with the media sheet being aligned thereon by the media carriage.

Once the punching operation is completed, the aligning means 142 of the media carriage 60 is activated with the registration pins 164 extending and fitting into the corresponding holes 112 and slots 114 formed on the leading edge 82 of the media sheet 12. The media carriage 60 is then commanded to lift the media sheet 12 and transport it to the drum 34 for photo-plotting operation. Thus, the media carriage 60 moves along the rails 122 to the end position disposed over the drum 34. With the registration pins 164 still extended and still engaged with the holes and slots of the media sheet, the first and second positioning means 126,128 are lowered towards the support surface 36 of the drum 34, as best seen in FIG. 12. The registration pins 164 are partially inserted into the bushing openings 50 such that the bull-nose portion 168 of each pin 164 roughly locates the corresponding opening 46, as best shown in FIG. 13. With the registration pins 164 being partially inserted into the bushing openings 50, the vacuum shuts "off" from the first and second positioning means 126, 128. The first positioning means 126 then moves in closer to the drum 34 such that the aligning surface 152 is pressed against the media sheet and the drum surface 36 with the registration pins 164 fully fitting into the bushing openings 50. The flexible coupling 170 allows the registration pins 164 to locate and fit into the mounting features of the media sheet and into the bushing openings 50, thus compensating for dimensional differences between the bushing openings 50. However, the tight tolerances between the diameter of the bushing openings 50 and the outside diameter 166 of the location defining portions 165 of the registration pins 164 and the diameter of the holes and slots of the media sheet ensure that the media sheet is fixed on the drum surface 36 of the drum in the direction perpendicular to the axial direction of the drum 34.

Once the registration pins 164 are fully inserted into the bushing openings 50 and the leading edge 82 of the media sheet 12 is properly aligned, the vacuum in the first zone 40 of the drum 34 is activated to ensure that the leading edge portion 82 of the media sheet 12 is secured in the aligned position to the drum surface 36. Subsequently, the vacuum of the second positioning means 128 is reactivated to push the media sheet 12 down against the drum 34 ensuring conformance of the media sheet 12 with the semicylindrical shape of the drum surface 36. The vacuum of the second zone 42 of the drum 34 is then activated to secure the trailing edge 84 of the media sheet 12 to the drum 34. Once the media sheet 12 is fully secured in the drum 34 in the aligned position, the aligning means 142 is disengaged with the registration pins 164 retracting to their retracted positions. The media carriage 60 is then moved away from the drum 34 and the imaging work operation is performed on the media sheet.

Upon completion of imaging of the media sheet 12, the media carriage 60 moves into the drum 34 with the first and second positioning means 126,128 acquiring vacuum and picking-up the media sheet 12. The aligning means 142 remain in the disengaged position. The media sheet is then moved by the media carriage 60 into the second intermediate position over the discharge means 72. The media sheet is then discharged from the system 10 through the discharge opening 26.

One advantage of the present invention is that the image generated on the media sheet is precisely positioned relative to the mounting features 110. The precise positioning is especially critical when multiple color final images are produced. For multiple color images, multiple media sheets are imaged and then superimposed one at a time onto the final product page. Therefore, it is critical that all images on the media sheets be identically aligned relative to the mounting features within the drum 34 and then within the printing press. By pre-punching the mounting features 110 in the media sheet 12 and by aligning the image with respect to the mounting features 110 within the drum 34, the present invention minimizes misalignment errors in the final product.

In the best mode embodiment, the sensor 172, air cylinder 146 and the registration pin couplings 170 are all manufactured by Compact Air, Inc. of Westminster, South Carolina. However, similar products can also be used in the present invention. The pin housing 150 is fabricated from plastic to prevent the aligning surface 152 from scratching or damaging the drum surface 36. In the preferred embodiment of the present invention, the tolerances of the inside diameter of the bushing openings 50 and the outside diameter 166 of the registration pins 164 are very tight and are within 0.0004+ 0.0001 of an inch. The inserts 48 and the bushings 49 are provided in the best mode embodiment of the present invention to ensure proper alignment of the openings formed in the drum 34 which accept the registration pins 164. However, other methods for providing openings within the drum 34 to accept the registration pins 164 can be used.

The mounting features 110 used for positioning the media sheet 12 on the drum 34 need not be, and usually are not the features, used to locate the media sheet on the printing press. Different printing presses use different locating and mounting features so that the punching means punches both holes compatible with the bushing openings 50 of the drum 34 and other holes or notches compatible with the printing press cylinder on which the media sheet 12 is to be used.

While the present invention has been illustrated and described with respect to a particular embodiment thereof, it should be appreciated by those of ordinary skill in the art, that various modifications to this invention may be made without departing from the spirit and scope of the present invention.

We claim:

1. A system for photo-plotting onto and handling a media sheet, said system comprising:

a plurality of aligning means disposed on a media carriage transporting said media sheet to a drum of a photo-plotter, each of said plurality of aligning means having an engaged position and a disengaged position, in said engaged positions each of said plurality of aligning means passing through a plurality of mounting features formed within said media sheet and being engageable with a plurality of drum openings formed in said drum to position said media sheet relative to said drum for subsequent imaging;

a registration pin mounted within a registration pin subassembly;

a registration pin subassembly housing for housing said registration pin subassembly therein;

a piston being coupled to said registration pin subassembly, said piston and said registration pin having retracted and extended positions corresponding to said disengaged and said engaged positions of said aligning means; and a piston housing having a piston cavity for accommodating said piston and first and second cavity openings on opposite sides of said piston.

2. The system according to claim 1, wherein each said registration pin is mounted within a registration pin coupling, said registration pin coupling allowing flexible movement of said registration pin therein.

3. The system according to claim 1, wherein said aligning means further comprises a sensor for detecting a position of said piston.

4. The system according to claim 1, wherein said plurality of mounting features formed within said media sheet comprises at least one hole and one slot.

5. The system according to claim 1, wherein said pin housing has an aligning surface to mate with a drum support surface of said drum.

6. The system according to claim 1, wherein said first and second cavity openings are alternatingly supplied with pressurized air to activate said piston into said retracted and extended positions.

7. The system according to claim 1, wherein each said drum opening is formed by a bushing inserted into said drum, said bushing having a bushing inside diameter defining said drum opening.

8. The system according to claim 7, wherein each said bushing is fitted within an insert secured in said drum opening.

9. The system according to claim 1, wherein each said registration pin has a bullet nose portion for locating said drum opening.

10. The system according to claim 1, wherein said registration pin has a pin outer diameter for fitting into said drum opening.

11. The system according to claim 1, further comprising a punching means for punching said plurality of mounting features within said media sheet.

12. A method for handling a media sheet in a system for photo-plotting and handling said media sheet and including a drum with an internal drum support surface for said media sheet, said method comprising the steps of:

transporting said media sheet to said drum with a media carriage;

positioning said media sheet on said drum support surface of said drum such that a plurality of registration pins each being extended from a corresponding plurality of aligning means disposed on said media carriage to pass through a plurality of mounting features and fit into a corresponding plurality of drum openings formed within said drum support surface of said drum; and sensing a position of said registration pins relative to said aligning means.

13. The method according to claim 12, comprising an additional step preceding said step of positioning, said additional step being:

engaging said plurality of mounting features formed within said media sheet with said plurality of registration pins of said aligning means.

14. The method according to claim 12 comprising a preceding step of:

transporting said media sheet from a supply stack to a punching means with a media carriage.

15. The method according to claim 12, comprising a preceding step of:

punching a plurality of mounting features within a leading edge of said media sheet.

16. A system for photo plotting and handling a media sheet, said system comprising:

a photo-plotter having a drum with a drum support surface, said drum support surface having a plurality of drum openings formed therein;

a media handler being disposed adjacent to said photo-plotter, said media handler having a positioning means for picking-up and transporting said media sheet, said positioning means having a plurality of aligning means with a corresponding plurality of registration pins, said aligning means having an engaged position and a disengaged position, in said engaged position said plurality of registration pins passing through a plurality of mounting openings formed within said media sheet and to fit in said plurality of drum openings for proper positioning of said media sheet in said drum; and a sensor for detecting a position of said registration pins relative to said aligning means.

17. The system according to claim 16, wherein each of said plurality of alignment means further comprises:

a registration pin subassembly for mounting said registration pin therein;

a registration pin subassembly housing for housing said registration pin subassembly therein;

a piston being coupled to said registration pin subassembly, said piston and said registration pin having a retracted and extended positions corresponding to said engaged and disengaged positions of said aligning means, respectively; and a piston housing having a piston cavity for accommodating said piston and a first and second cavity openings.

18. A system for photo-plotting and handling a media sheet, said system comprising:

a drum having a drum support surface and a plurality of drum openings formed therein;

a media sheet supply station having a supply of said media sheets;

a punching means disposed between said media sheet supply station and said drum for punching a plurality of mounting features within said media sheet;

a media carriage for transferring said media sheet from said media sheet supply station to said punching means and from said punching means to said drum support surface;

a plurality of suction gripper elements disposed on said media carriage and actuable by vacuum to grip said media sheet when transferring said media sheet from said supply station to said punching means and when transferring said media sheet from said punching means to said drum support surface; and a plurality of aligning means disposed on said media carriage and having an engaged position and a disengaged position, each of said plurality of aligning means having a registration pin with an extended position and a retracted position, corresponding to said engaged and disengaged positions of said aligning means, each said registration pin having a free bull-nose portion and a location defining portion following said bullnose portion;

means for operating said aligning means to move said pins to their extended position prior to said media sheet reaching said drum with said plurality of mounting features of said media sheet are positioned on said pins; and means operable when said media sheet reaches said drum support surface for first inserting said bullnose portions of said pins into said drum openings sufficiently to prevent said media sheet from falling from said pins, for then releasing the vacuum holding said suction gripper elements to said sheet, and for then further inserting said pins into said drum opening until said location defining portions of said pins are received in said drum openings to precisely position said media sheet relative said drum support surface.

* * * * *